Figure 2:
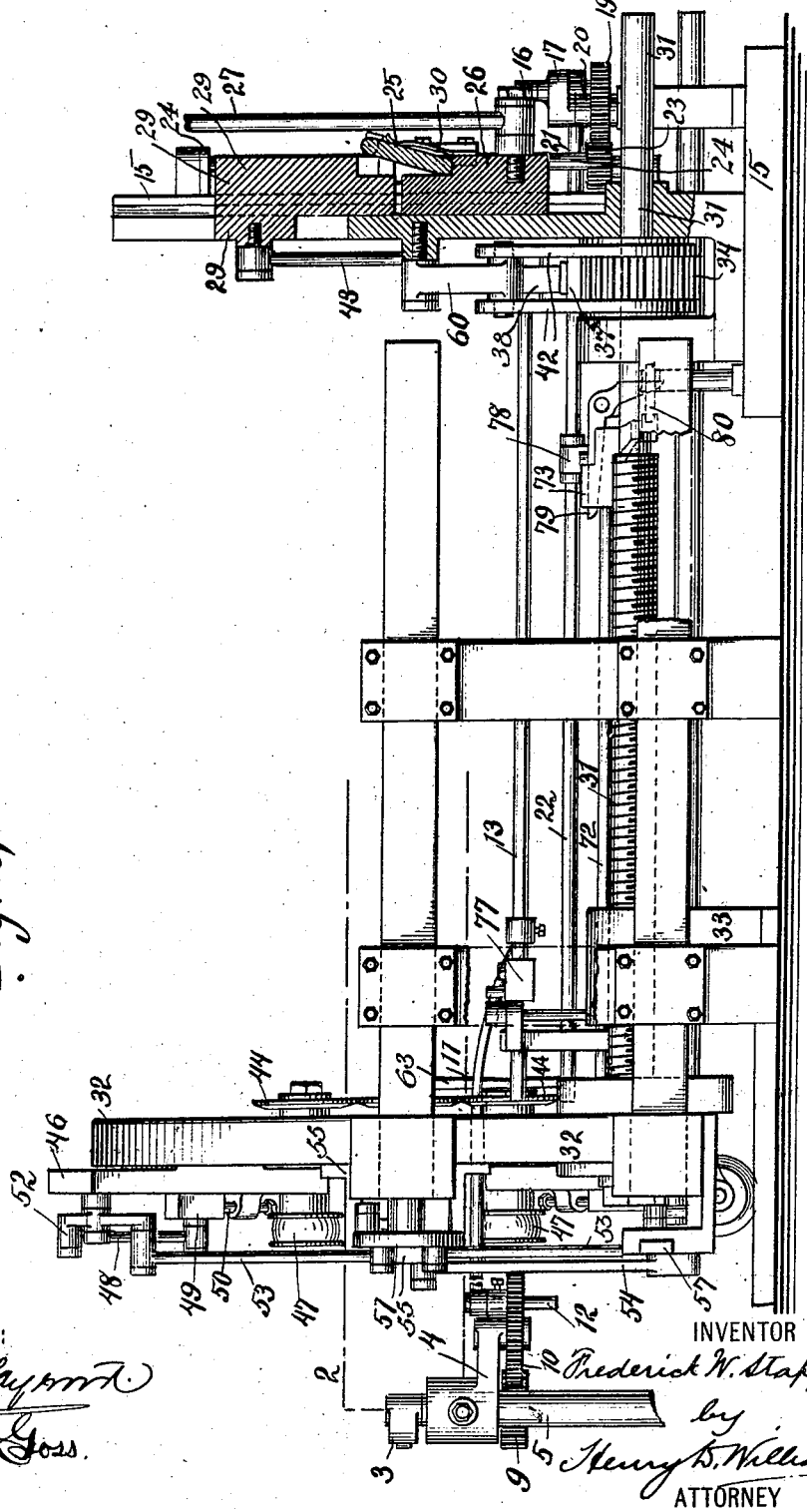

No. 680,443.  
Patented Aug. 13, 1901.  
F. W. STAPF.  
PIPE CUTTING MECHANISM.  
(Application filed Feb. 14, 1901.)
(No Model.)  
4 Sheets—Sheet 1.
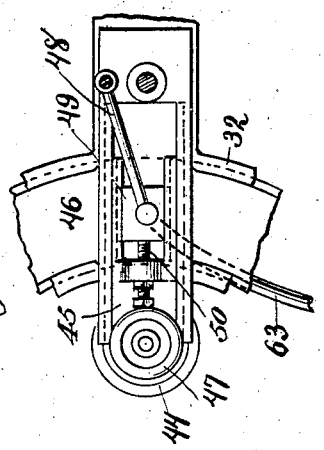
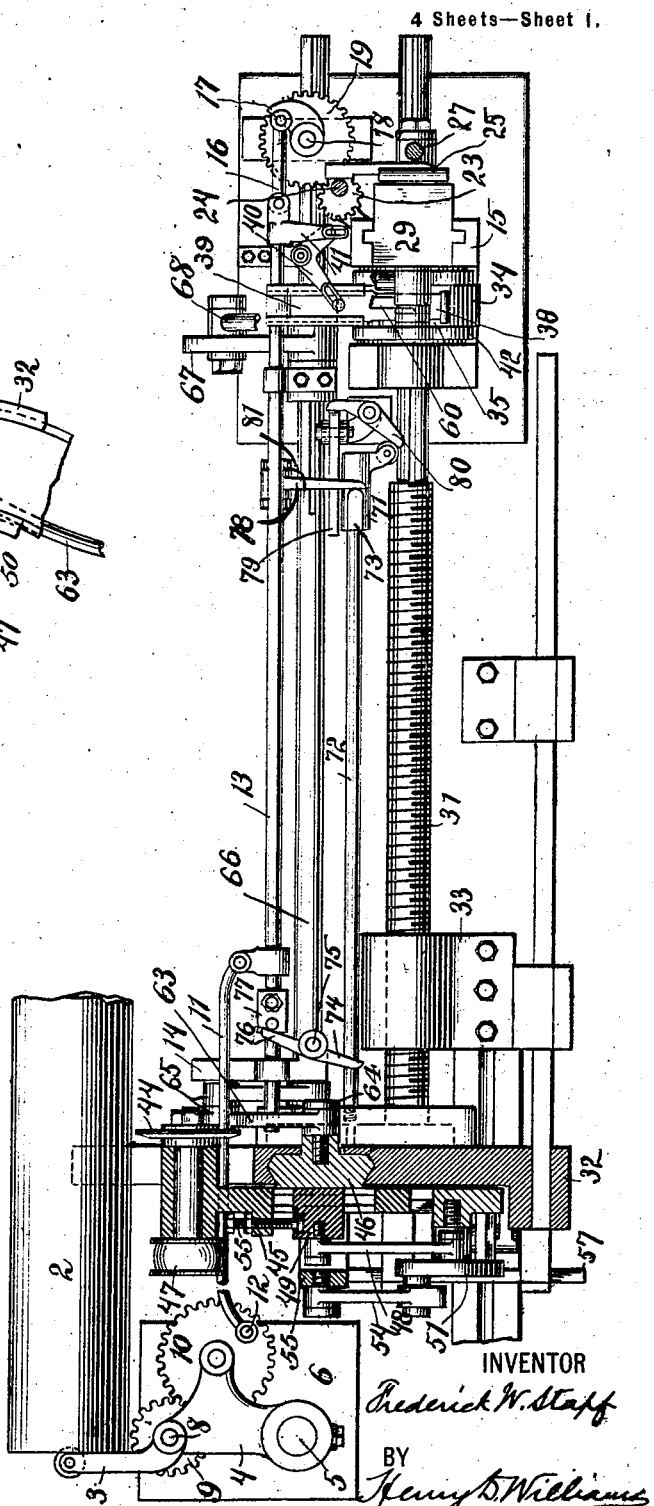
WITNESSES:  
INVENTOR  
Frederick W. Stapf  
BY  
Henry D. Williams  
ATTORNEY No. 680,443. Patented Aug. 13, 1901.
F. W. STAPF.
PIPE CUTTING MECHANISM.
(Application filed Feb. 14, 1901.)

(No Model.) 4 Sheets—Sheet 2.

WITNESSES:
D. N. Hayward
Harry A. Goss.

INVENTOR
Frederick W. Stapf
by
Henry D. Williams
ATTORNEY

No. 680,443. Patented Aug. 13, 1901.
F. W. STAPF.
PIPE CUTTING MECHANISM.
(Application filed Feb. 14, 1901.)
(No Model.) 4 Sheets—Sheet 3.

WITNESSES:
D. W. Hayward
Harry L. Goss.

INVENTOR
Frederick W. Stapf
BY
Henry D. Williams
ATTORNEY

No. 680,443. Patented Aug. 13, 1901.
F. W. STAPF.
PIPE CUTTING MECHANISM.
(Application filed Feb. 14, 1901.)

(No Model.) 4 Sheets—Sheet 4.

WITNESSES:
D. W. Naysmith
Harry L. Goss

INVENTOR
Frederick W. Stapf
BY
Henry D. Williams
ATTORNEY

UNITED STATES PATENT OFFICE.

FREDERICK W. STAPF, OF BROOKLYN, NEW YORK, ASSIGNOR TO JOHN A. WILBUR, OF NEW YORK, N. Y.

PIPE-CUTTING MECHANISM.

SPECIFICATION forming part of Letters Patent No. 680,443, dated August 13, 1901.

Application filed February 14, 1901. Serial No. 47,298. (No model.)

*To all whom it may concern:*

Be it known that I, FREDERICK W. STAPF, a citizen of the United States, and a resident of the borough of Brooklyn, in the city of New York, State of New York, have invented new and useful Improvements in Pipe-Cutting Mechanism, of which the following is a specification, reference being had to the accompanying drawings, forming part thereof.

This invention relates to pipe-cutting mechanism, and it consists in the provision of automatic means for cutting pipes in predetermined lengths.

The means embodying my invention are constructed for use in connection with a pipe-making machine, and according to my invention the cutting means are moved longitudinally with the pipe as the pipe is fed forward in the pipe-making machine, and the position and actuation of the pipe required for the pipe-making operation are not in any way disturbed or altered, so that the operation of the pipe-making machine is not interrupted while the pipe is being cut. According to my invention a controller is provided of improved construction actuated by the pipe, and this controller automatically starts the actuation of the cutting mechanism at the proper point to cut off the predetermined length of pipe.

My invention further consists in the provision of one or more cutters automatically actuated in a circular path about the pipe and automatically controlled, so as to perform the cutting operation, and, further, in reciprocating such cutter or cutters in such circular path.

My invention further consists in the provision of means of improved construction for automatically continuing the actuation of the cutting means for a predetermined period and then discontinuing the actuation of the same and returning the cutting means to normal position.

My invention further consists in various improvements in construction and combinations of parts and has various objects and advantageous features, which will hereinafter more fully appear.

I will now describe a construction of pipe-cutting mechanism embodying my invention illustrated in the accompanying drawings and will thereafter point out the novel features in claims.

Figure 4:
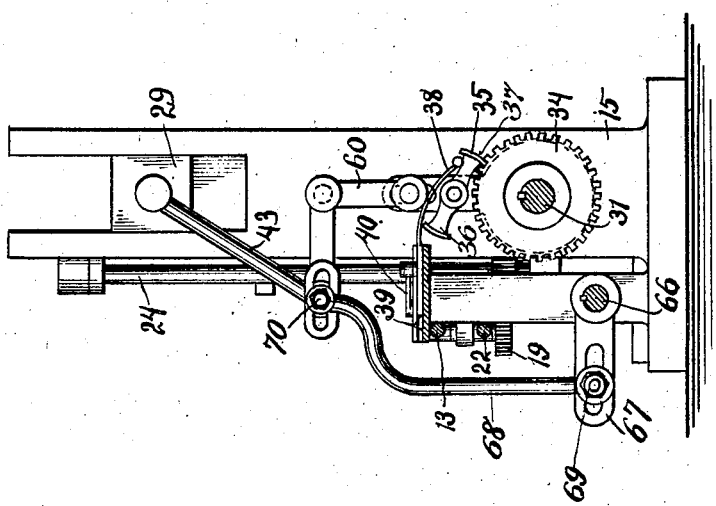
Figure 3:
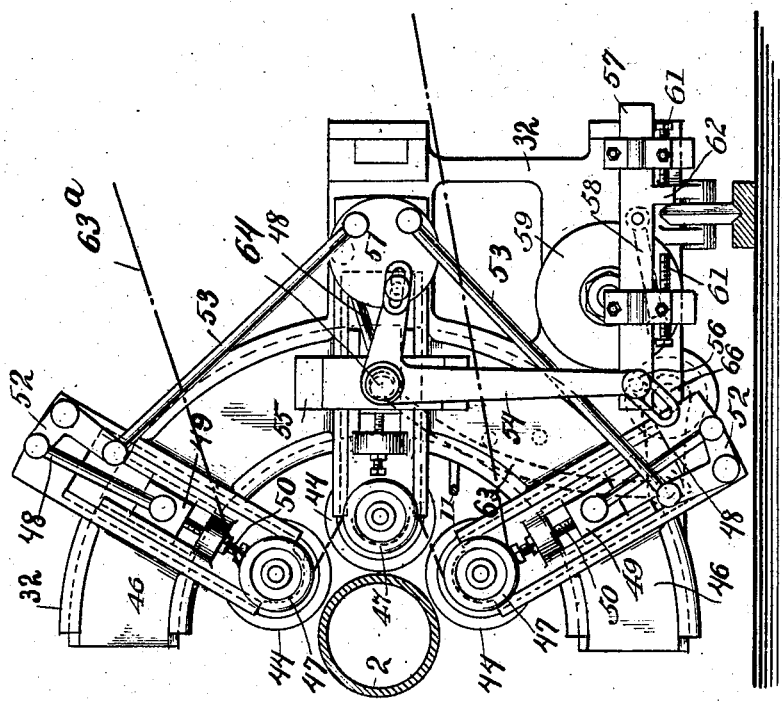
Figure 7:
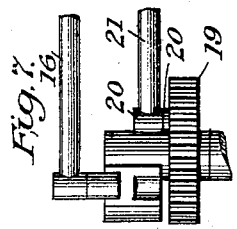
Figure 8:
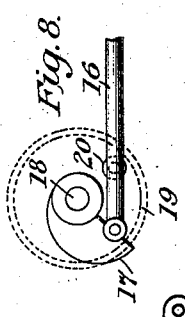
Figure 6:
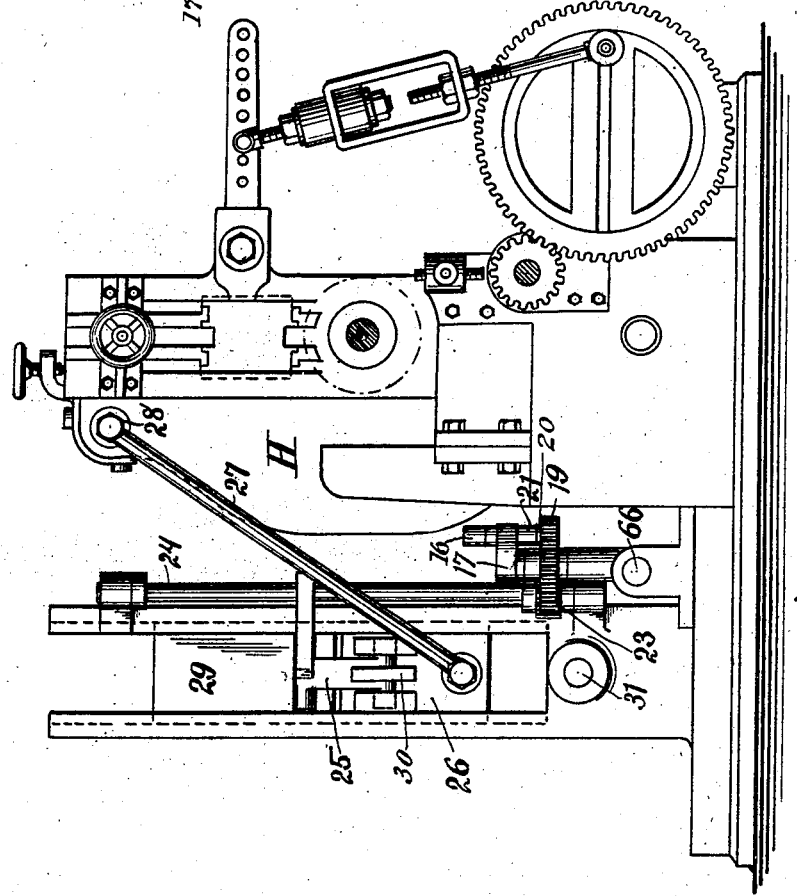

Figure 1 is a plan view, partly in section, of a pipe-cutting mechanism embodying my invention. Fig. 2 is a side elevation of the same, also partly in section. Fig. 3 is a front elevation of the cutter-head and adjacent parts. Fig. 4 is a front elevation of the rear standard and adjacent parts. Fig. 5 is a detail of the middle cutter-block and adjacent parts. Fig. 6 is a rear elevation of the rear standard and showing the connection with the pipe-making machine. Fig. 7 is an enlarged detail side elevation of part of the actuating mechanism. Fig. 8 is a plan view of the same.

The pipe-cutting mechanism embodying my invention shown in the accompanying drawings is particularly adapted for use in connection with the well-known spiral-jointed-pipe-making machine described in patent to John B. Root, No. 271,740, of February 6, 1883.

The pipe 2 is formed upon a mandrel and intermittently rotated and fed forward, and my pipe-cutting mechanism is constructed to cut off the pipe in predetermined lengths as it is thus rotated and fed forward without interruption to the operation of the pipe-making machine. Motion is imparted to my pipe-cutting mechanism from the oscillating frame of such machine, and the operation of the pipe-cutting mechanism is automatically controlled, so as to start the same at the desired point to cut off the predetermined length of pipe and to return the same to normal position after the completion of each cutting operation ready to be operated at the proper time to cut off the succeeding length of pipe.

I will first describe the automatic means for starting the operation of the cutters.

A controller is provided which engages the end of the pipe, such controller consisting of a pivoted controlling-arm 3, located so as to project in the path of the advancing pipe and secured upon a short vertical shaft 8, mounted in a bearing on a bracket 4, this bracket being adjustably held upon a column 5 and this column extending up from an adjustable plate 6, which is longitudinally adjustable upon a suitable bed-plate. (Not shown.) The longitudinal adjustment of the plate 6 permits the position of the controlling-arm to be adjusted to set the cutting mechanism to cut off different lengths of pipe and the vertical adjustment of the bracket 4 permits the vertical adjustment of the controlling-arm 3, where such adjustment is necessary to accommodate different sizes of pipe.

Upon the shaft 8 of the controlling-arm 3 is secured a pinion 9, meshing in a gear 10, fitted to oscillate upon the frame 4, and a connecting-rod 11 is pivotally mounted upon a crank-pin 12 on the gear 10, this crank-pin being vertically adjustable to accommodate the vertical adjustment of the arm and bracket and the connecting-rod 11 being longitudinally adjustable to accommodate the longitudinal adjustment of the arm 3. The connecting-rod 11 extends rearward and is pivotally connected at its rear end to a shifting rod 13, fitted to slide in bearings in fixed standards 14 and 15, and when the advancing end of the pipe 2 strikes the controlling-arm 3 and moves the arm out of its path the shifting rod 13 is moved forward. The shifting rod 13 is connected at its rear end by a connecting-rod 16 with an engaging part, consisting of an oscillating hook 17, loosely mounted on a vertical shaft 18, fitted in bearings in the standard 15. A gear 19 is secured upon this vertical shaft 18 and has an upwardly-extending crank-pin 20, which is engaged by the oscillating hook 17. Upon this crank-pin 20 is pivotally mounted a connecting-rod 21, extending forward to and pivotally connected with another shifting rod 22, also fitted to slide in the standards 14 and 15 and shown as arranged below the shifting rod 13. The hook 17 is constructed to engage with the crank-pin 20 and move it forward when the upper shifting rod 13 is moved forward by the controlling-arm 3, and thereby to actuate the lower connecting-rod 21 and lower shifting rod 22 in the same direction; but when the upper shifting rod 13 is moved rearward the hook 17 moves away from the crank-pin 20 and does not actuate the crank-pin and lower shifting rod 22. (See Figs. 7 and 8.) The gear-wheel 19 meshes with a pinion 23, secured upon a vertical shaft 24, fitted to oscillate in bearings in the standard 15, the greater part of the length of which shaft is eccentric to its axis, and which eccentric shaft actuates a lock-arm 25, pivotally mounted in a block 26, the block 26 being fitted to slide in vertical ways in the standard 15 and actuated by the connecting-rod 27 from some suitable part of the pipe-making machine, as the arm 28, extending from the oscillating frame H thereof. This sliding block 26 is thus continually reciprocated so long as the pipe-making machine is operated. Above the sliding block 26 is another sliding block 29, and the lock-arm 25 is constructed to engage therewith to lock the two sliding blocks 26 and 29 together, so that the motion of the lower sliding block 26 will be communicated to the upper sliding block 29, a spring 30 tending to press the lock-arm 25 into engaging position and the eccentric shaft 24 holding the lock-arm normally out of engagement. When the eccentric shaft 24 is actuated as a result of the actuation of the controlling-arm 3, as above described, the eccentric shaft 24 is rotated through half a revolution and moved out of the path of the lock-arm 25, and the lock-arm is pressed inwardly by its spring, and upon rising to higher position moves into engagement with the sliding block 29 and locks the two sliding blocks together. This operation starts the actuation of the cutting mechanism. The mechanism thus actuated comprises cutting means and feeding means.

The feeding means comprises a feed-screw 31, having a thrust-imparting bearing at its front end in the cutter-head 32 and rotating in a fixed nut 33, and by its rotation feeding the cutter-head forward and rotating and sliding in a bearing in the standard 15 and having a ratchet-wheel 34 splined thereon, so as to rotate the feed-screw, but not to partake of its longitudinal movement, this ratchet-wheel 34 being restrained from longitudinal movement by engagement with the standard 15. The ratchet-wheel 34 is actuated by a reversible pawl 35, centrally pivoted in the oscillating arm 42, actuated as hereinafter described, and the pawl is constructed so that in one position, with its tooth 36 engaged with the ratchet-wheel 34, it will rotate the feed-screw 31, so as to feed the cutter-head forward with the pipe 2, and in the reverse position, with the tooth 37 in engagement with the ratchet, which is the normal position shown, it will rotate the feed-screw, so as to feed the cutter-head backward to return the cutter-head to normal position, and the pawl 35 is rocked from one position to the other and spring-actuated in either position by the controlling-spring 38, carried in a horizontally-moving slide 39. The slide 39 is actuated by the upper shifting rod 13 through a bell-crank 40, engaging with a stud thereon and with an arm 41, projecting from the upper shifting rod, and when this shifting rod is actuated by the controlling-arm 3 and moved forward it will actuate the slide 39 and controlling-spring 38 and reverse the pawl 35 from the normal position in which it was left at the conclusion of the last backward movement of the cutter-head 32 to the position for causing a forward movement of the cutter-head.

The oscillating arm 42, carrying the reversible feed-pawl 35, is composed of two similar parts, one on each side of the feed-ratchet 34 and pivoted thereon and is actuated by the bell-crank 60, pivoted upon the standard 15, one arm of which extends down to and has a slotted engagement with the feed-pawl arm, and the other arm of which extends laterally and is joined by the connecting-rod 43 with the upper sliding block 29, so that it receives an oscillating movement therefrom when the upper block 29 is locked to and actuated by the lower block 26.

By the mechanism above described the feed-screw 31 will be rotated so as to feed the cutter-head 32 forward when the controlling-arm 3 is actuated by the advancing end of the pipe, and this forward movement will be continued for a predetermined time, amply sufficient to insure cutting through the pipe. For the purpose of reversing the feed-pawl 35, and thereby reversing the direction of rotation of the feed-screw 31, I provide a reversing-collar 71, adjustably secured upon a rod 72, this rod being secured at its front end in the cutter-head 32, so as to move therewith. This reversing-collar has a projection 73, which as it moves forward with the cutter-head comes in contact with and moves forward the arm 74, secured on a vertical shaft 75, this shaft 75 having bearings in the front standard 14, and another arm 76 on this shaft 75 is actuated thereby and moves rearwardly the upper shifting rod 13 by engagement with an adjustable collar 77 on such upper shifting rod, and thereby reverses the feed-pawl 35, so that the back-feed tooth 37 is moved into operative position and moves the hook 17 back to the normal position shown, but does not actuate the crank-pin 20 on the gear 19, and does not therefore unlock the two sliding blocks 26 and 29. This movement also returns the controlling-arm 3 to normal position, and as the cutters have now cut through the pipe and the severed length has dropped off or has been removed there will be no obstruction by the pipe to such movement of the controlling-arm. The feed-screw 31 is now actuated in the reverse direction and the cutter-head 32 moved rearwardly thereby. This operation will be continued until the projection 73 on the reversing-collar 71 comes in contact with and moves rearwardly the stop-arm 78, projecting from the lower shifting rod 22, thereby moving the crank-pin 20 rearwardly and actuating the gears 19 and 23 and turning the eccentric shaft 24 through half a revolution, so as to force the lock 25 out of engagement with the upper sliding block 29, thereby discontinuing the actuation of the upper sliding block and and of all parts of the cutting mechanism.

As the stop-arm 78 on the lower shifting rod 22 is moved forward by the lower shifting rod when the lower shifting rod is moved forward by the actuation of the controlling-arm 3 to start the forward movement of the cutting mechanism, I provide for lifting the stop-arm 78 clear of the projection 73 when the cutter-head is in extreme backward position by means of a pivoted latch 79, having an arm extending under the stop-arm 78 and another arm engaged by the pivoted lever 80, this lever being actuated by a rear projection on the reversing-collar 71. The stop-arm 78 is connected to the lower shifting rod on which it is mounted, so as to be capable of swinging upward slightly thereon under control of the spring 81, but is confined by collars, so as to move longitudinally with the shifting rod.

The cutting means comprise rotary cutters and means for actuating them to bring them into contact with the pipe, to oscillate them about the pipe, and to press them against the pipe with a constant pressure, so that they may be fed inward as they cut through the pipe and to return them to normal position out of contact with the pipe after the completion of each cutting operation. Three of these rotary cutters are shown, each consisting of a rotary cutting-disk 44, secured upon the rear end of a short shaft having a pulley 47 at its front end and carried in bearings in a cutter-block 45, fitted to slide radially to the pipe 2 in ways in the oscillating carrier 46, this oscillating carrier being fitted in an arc-shaped sliding bearing formed in the cutter-head 32 concentrically with the pipe and receiving a reciprocating circular movement in this bearing from the means hereinafter described. Each of the cutter-blocks 45 has a connecting-rod 48, pivotally connected at its inner end to an adjustable block 49, adapted to slide upon the cutter-block 45 and held relatively thereto by an adjusting-screw 50. The connecting-rod 48 of the middle cutter 44 is pivotally connected at its outer end to the crank-disk 51 on the carrier, and the connecting-rods 48 48 of the two other cutters are respectively connected at their outer ends to bell-cranks 52 52, which respectively receive motion through connecting-rods 53 53 from the crank-disk 51. The crank-disk 51 receives motion from a bell-crank 54, pivoted upon a bridge-piece 55 on the carrier 46, a downwardly-extending arm of which bell-crank 54 has a slotted connection with a pin 56 upon a horizontally-moving slide 57, sliding in ways on the cutter-head 32, this slide being actuated through a connecting-rod 58 from a friction-disk 59, mounted upon the front end of the feed-screw 31 and having a frictional engagement therewith. When the feed-screw is rotated, its first movement in either direction will actuate the slide 57. In the normal position shown the cutters 44 are clear of the pipe. When the controlling-arm 3 is actuated, and in consequence thereof the feed-screw 31 is rotated, the slide 57 will be actuated and will actuate the bell-crank 54 and crank-disk 51 and connected parts to move the cutters inward into contact with the pipe 2 and, further, to press the cutters forward to their work, so that they will enter and cut through the pipe. When the movement of the feed-screw is reversed, the crank-disk 51 will be actuated in the reverse direction and will withdraw the cutters from the pipe and return them to normal position clear of contact with the pipe. For the purpose of limiting the movement of the crank-disk 51 and slide 57 I provide adjustable stop-screws 61 61 in lugs projecting from the cutter-head 32 and a stop projection 62 extending downward from the slide 57 between the stop-screws 61 61.

The cutters 44 are shown as rotated by a belt 63ª, passing over all of the pulleys 47 on the cutter-shafts, and this belt passes inside the upper cutter-pulley, outside the middle cutter-pulley, and inside the lower cutter-pulley, and as its tension will cause a pull directly inward to be imparted to the middle cutter and pulls obliquely outward to be imparted to the upper and lower cutters and the cutters are all connected together by the mechanism above described the tension of this belt will be nearly if not completely balanced and will not therefore interfere with the proper movement of the cutters toward and from the axis of the pipe. This belt would also be passed over a driving-drum (not shown) of sufficient length to permit the belt 63ª to follow the axial movement of the cutter-pulleys resulting from the movement of the cutter-head.

The oscillating arc-shaped cutter-carrier 46 is actuated by a connecting-rod 63, pivoted at its upper end upon a pivot-pin 64, projecting rearwardly from the carrier 46 through a slot in the cutter-head. The lower end of the connecting-rod 63 is pivotally connected at its lower end to an arm 65 on an oscillating shaft 66, fitted at its front end in a bearing in the cutter-head 32 and held therein, so as to move longitudinally with the cutter-head, and extending rearward through a guide-bearing in the rear standard 15 and having an actuating-arm 67 splined thereon, so as to impart oscillating movement thereto, but restrained from longitudinal movement by engagement with the standard 15. This actuating-arm is joined by a connecting-rod 68 to the lateral arm of the bell-crank 60, which, as above described, is joined by a connecting-rod 43 with the upper sliding block 29. Adjustment of the throw of the actuating-arm 67 and cutter-carrier 46, actuated thereby, is provided by making the pivot-pin 69 therein of the connecting-rod 68 adjustable in a slot on the arm, and adjustment of the throw of the feed-pawl 35 is provided by making the pivot-pin 70 of the two connecting-rods 68 and 43 in the lateral arm of the bell-crank 60 adjustable in a slot in this arm.

The actuation of the arc-shaped cutter-carrier 46 by the mechanism above described causes the cutters 44 to have a limited circular reciprocating movement about the pipe, and as the pipe is intermittently rotated in one direction by the pipe-making machine the cutting-action will thus be properly distributed and will extend around the entire periphery of the pipe. As the cutters are at the same time continuously rotated on their own axes and pressed inward to their work the cutting action will be effective and clean.

It is obvious that various modifications may be made in the construction shown and above particularly described within the spirit and scope of my invention.

What I claim, and desire to secure by Letters Patent, is—

1. In a pipe-cutting mechanism, the combination with one or more cutters, of means for moving the cutter or cutters into contact with the pipe and actuating the same to cut the pipe and for feeding the cutter or cutters longitudinally of the pipe during the cutting operation, substantially as set forth.

2. In a pipe-cutting mechanism, the combination with one or more cutters, of a controller located in the path of the pipe and having a fixed pivotal point and constructed to be actuated by the pipe and moved completely out of the path of the pipe and by such movement to actuate the cutter or cutters, substantially as set forth.

3. In a pipe-cutting mechanism, the combination with one or more cutters, of a controller located in the path of the pipe and constructed to be actuated by the pipe and moved out of the path of the pipe and means controlled thereby for moving the cutter or cutters into contact with the pipe and actuating the same to cut the pipe and for feeding the cutter or cutters longitudinally of the pipe during the cutting operation, substantially as set forth.

4. In a pipe-cutting mechanism, the combination with one or more cutters, and a traveling cutter-head carrying the same of a controller located in the path of the pipe and constructed to be actuated by the pipe and moved out of the path of the pipe and thereby to cause the starting movement of the cutter-head, and means for continuing and completing such movement and for moving the cutter or cutters into contact with the pipe and actuating the same to cut the pipe, substantially as set forth.

5. In a pipe-cutting mechanism, the combination with one or more cutters, of means for moving the cutter or cutters in a circular path about the pipe and for feeding the cutter or cutters longitudinally of the pipe during the cutting operation, substantially as set forth.

6. In a pipe-cutting mechanism, the combination with one or more cutters, of a controller adapted to be actuated by the pipe and means controlled thereby for moving the cutter or cutters in a circular path about the pipe and for feeding the cutter or cutters longitudinally of the pipe during the cutting operation, substantially as set forth.

7. In a pipe-cutting mechanism, the combination with one or more cutters, a carrier for the same, and a traveling cutter-head in which the carrier is fitted for circular movement about the pipe, of means for actuating the carrier and cutter or cutters and feeding the cutter-head longitudinally of the pipe during the cutting operation, substantially as set forth.

8. In a pipe-cutting mechanism, the combination with one or more cutters, a carrier for the same, and a traveling cutter-head in which the carrier is fitted for circular movement about the pipe, of a controller adapted to be actuated by the pipe to cause the starting movement of the cutter-head and carrier and cutter or cutters, and means for continuing and completing such movement, substantially as set forth.

9. In a pipe-cutting mechanism, in combination, a plurality of cutters, cutter-blocks in which the cutters are mounted, and means for actuating the cutter-blocks, adapted to move the cutters toward and from the pipe, a carrier for the cutter-blocks, and automatic means for reciprocating the carrier in a circular path about the pipe to effect a cutting operation, substantially as set forth.

10. In a pipe-cutting mechanism, in combination, a plurality of cutters and cutter-blocks, in which the cutters are mounted, and means for actuating the cutter-blocks adapted to move the cutters toward and from the pipe, a carrier for the cutter-blocks, and means for moving the carrier circularly about the pipe and for feeding the carrier longitudinally of the pipe during the cutting operation, substantially as set forth.

11. In a pipe-cutting mechanism, the combination with one or more cutters, of means for reciprocating the cutter or cutters in a circular path about the pipe and for feeding the cutter or cutters longitudinally of the pipe during the cutting operation, substantially as set forth.

12. In a pipe-cutting mechanism, the combination with one or more cutters, of a controller adapted to be actuated by the pipe and means controlled thereby for reciprocating the cutter or cutters in a circular path about the pipe and for feeding the cutter or cutters longitudinally of the pipe during the cutting operation, substantially as set forth.

13. In a pipe-cutting mechanism, the combination with one or more cutters, a carrier for the same and a traveling cutter-head in which the carrier is fitted for circular movement about the pipe, of means for reciprocating the carrier and actuating the cutter or cutters and feeding the cutter-head longitudinally of the pipe during the cutting operation, substantially as set forth.

14. In a pipe-cutting mechanism, the combination with one or more cutters, a carrier for the same and a traveling cutter-head in which the carrier is fitted for circular movement about the pipe and means for reciprocating the carrier, of a controller adapted to be actuated by the pipe to cause the starting movement of the cutter-head and carrier and cutter or cutters, and means for continuing and completing such movement, substantially as set forth.

15. In a pipe-cutting mechanism, the combination with cutting means and feeding means, the feeding means being constructed to feed the cutting means longitudinally of the pipe, of a controller adapted to be actuated by the pipe, a shifting mechanism connected therewith and constructed to shift the feeding and cutting mechanism to actuating condition for the forward movement thereof, and reversing means brought into action by the forward movement of the cutting means to put the feeding mechanism and cutting mechanism in condition for the backward movement thereof, substantially as set forth.

16. A pipe-cutting mechanism, in combination, cutting means and feeding means and actuating mechanism for the same, the feeding means being constructed to feed the cutting means longitudinally of the pipe, a controller adapted to be actuated by the pipe and a shifting mechanism and an engaging part actuated by the controller, the shifting mechanism being actuated by such controller to shift the feeding and cutting means to actuating condition for the forward movement thereof and the engaging part being actuated by the controller to engage and start the actuating mechanism, reversing means brought into action by the forward movement of the cutting means to actuate the shifting mechanism and engaging part in the reverse direction and thereby to put the feeding means and cutting means in condition for the backward movement thereof, and means brought into action by the reverse movement of the cutting means to discontinue the actuation of the actuating mechanism, substantially as set forth.

17. In a pipe-cutting mechanism, in combination, cutting means and feeding means and actuating mechanism for the same, the feeding means being constructed to feed the cutting means longitudinally of the pipe, a controller adapted to be actuated by the pipe and a shifting rod and a hook actuated by the controller, means actuated by such shifting rod to shift the feeding and cutting means to actuating condition for the forward movement thereof, such hook being actuated by the controller to engage and start the actuating mechanism, reversing means brought into action by the forward movement of the cutting means to move the shifting rod and hook in the reverse direction, thereby putting the feeding means and cutting means in condition for the backward movement thereof, and means brought into action by the reverse movement of the cutting means to discontinue the actuation of the actuating mechanism, substantially as set forth.

18. In a pipe-cutting mechanism, in combination, cutting means and feeding means and actuating mechanism for the same, the feeding means being constructed to feed the cutting means longitudinally of the pipe, a controller adapted to be actuated by the pipe and a shifting rod and a hook actuated by the controller, means actuated by such shifting rod to shift the feeding and cutting means to actuating condition for the forward movement thereof, means engaged by such hook to start the actuating mechanism, reversing means brought into action by the forward movement of the cutting means to move the shifting rod and hook in the reverse direction, thereby putting the feeding means and cutting means in condition for the backward movement thereof, and another shifting rod connected to the starting means of the actuating mechanism and actuated by the reverse movement of the cutting means to discontinue the actuation of the actuating mechanism, substantially as set forth.

19. In a pipe-cutting mechanism, the combination with cutting means and feeding means, the feeding means being constructed to feed the cutting means longitudinally of the pipe, of a controller adapted to be actuated by the pipe, an actuating part adapted to be continually actuated and means connected to the controller for connecting such actuating part with the feeding and cutting mechanism, substantially as set forth.

20. In a pipe-cutting mechanism, the combination with cutting means and feeding means, the feeding means being constructed to feed the cutting means longitudinally of the pipe, of a controller adapted to be actuated by the pipe, an actuating part adapted to be continually actuated, and means connected to the controller for connecting such actuating part with the feeding and cutting mechanism and means independent of the controller for disconnecting such actuating part from the feeding and cutting mechanism, substantially as set forth.

21. In a pipe-cutting mechanism, the combination with cutting means and feeding means, the feeding means being constructed to feed the cutting means longitudinally of the pipe, of a controller adapted to be actuated by the pipe, an actuating part adapted to be continually actuated, means connected to the feeding and cutting mechanism, a locking part constructed to lock the actuating part thereto, a hook connected with the controller and constructed to put the locking part into condition for engagement when the controller is actuated by the pipe, means connected with the controller for shifting the feeding mechanism into condition for a forward movement thereof and for reversing such forward movement at a predetermined point and means actuated on the completion of the reverse movement to disengage the locking part and return the controller and connected means to normal position, substantially as set forth.

22. In a pipe-cutting mechanism, in combination, a cutter-head and cutting means carried thereby, a feeding device connected to the cutter-head and a feed-ratchet constructed to actuate the feeding device, a reversible pawl therefor, a controller adapted to be actuated by the pipe, means connected thereto for reversing the pawl and means controlled by the controller for actuating the feed-pawl and cutting means, substantially as set forth.

23. In a pipe-cutting mechanism, in combination, a cutter-head and cutting means carried thereby, a feeding device connected to the cutter-head and a feed-ratchet constructed to actuate the feeding device, a reversible pawl therefor, a spring for said pawl constructed to reverse the same and control its movement in either position, a controller adapted to be actuated by the pipe, means connected thereto and controlling the feed-pawl spring and means controlled by the controller for actuating the feed-pawl and cutting means, substantially as set forth.

24. In a pipe-cutting mechanism, in combination, a cutter-head and cutting means carried thereby, a feed-screw connected to the cutter-head, a feed-ratchet constructed to actuate the feed-screw, a reversible pawl therefor, a controller adapted to be actuated by the pipe, means connected thereto for reversing the pawl and means controlled by the controller for actuating the feed-pawl and cutting means, substantially as set forth.

25. In a pipe-cutting mechanism, in combination, a cutter-head and cutting means carried thereby, a feed-screw connected to the cutter-head, a controller adapted to be actuated by the pipe and controlling the means for actuating the feed-screw, a friction device connected to the feed-screw and means actuated thereby to put the cutting means into operative position when the feed-screw is actuated in one direction and to withdraw the cutting means from operative position when the feed-screw is actuated in the reverse direction, and means controlled by the controller for causing the actuation of the feeding mechanism, substantially as set forth.

26. In a pipe-cutting mechanism, in combination, one or more automatic feeding and actuating cutters, means for actuating the same to move the cutter or cutters into contact with the pipe and press the cutter or cutters against the pipe with a constant pressure and for moving the cutter or cutters away from the pipe after the completion of the cutting operation, substantially as set forth.

27. In a pipe-cutting mechanism, in combination, one or more cutters, a carrier for the same and automatic means for moving the cutter or cutters into contact with the pipe and pressing the cutter or cutters against the pipe with a constant pressure and reciprocating the carrier in a circular path about the pipe to effect the cutting operation, substantially as set forth.

28. In a pipe-cutting mechanism, in combination, one or more cutters, a carrier for the same, a friction device for moving the cutter or cutters into contact with the pipe and pressing the cutter or cutters against the pipe and means for moving the carrier in a circular path about the pipe, substantially as set forth.

29. In a pipe-cutting mechanism, in combination, one or more cutters, a carrier for the same, an automatic friction device for moving the cutter or cutters into contact with the pipe and pressing the cutter or cutters against the pipe, and automatic means for feeding the cutter or cutters longitudinally of the pipe during the cutting operation, substantially as set forth.

Signed at New York, N. Y., this 11th day of February, 1901.

FREDERICK W. STAPF.

Witnesses:
JOHN A. WILBUR,
HENRY D. WILLIAMS.